(12) United States Patent
Pagani et al.

(10) Patent No.: US 6,834,270 B1
(45) Date of Patent: Dec. 21, 2004

(54) SECURED FINANCIAL TRANSACTION SYSTEM USING SINGLE USE CODES

(76) Inventors: Carlo Pagani, 36, Via Falconi, 24060, Castelli Calepio, Province of Bergamo (IT); Gianpaolo Tocco, 39, Via Santissima Trinità, 25036 Palazzolo sull'Oglio, Province of Brescia (IT)

(*) Notice: Subject to any disclaimer, the term of this patent is extended or adjusted under 35 U.S.C. 154(b) by 0 days.

(21) Appl. No.: 09/514,166

(22) Filed: Feb. 28, 2000

(51) Int. Cl.[7] .................................................. G06F 17/60
(52) U.S. Cl. ........................... 705/65; 705/1; 705/50; 705/67; 705/70; 705/64
(58) Field of Search .................. 705/1, 50, 64, 705/66, 72, 67, 60, 70, 65

(56) References Cited

U.S. PATENT DOCUMENTS

| | | | | |
|---|---|---|---|---|
| 4,453,074 A | * | 6/1984 | Weinstein | 705/66 |
| 4,825,052 A | * | 4/1989 | Chemin et al. | 235/380 |
| 5,657,388 A | * | 8/1997 | Weiss | 713/185 |
| 5,794,207 A | * | 8/1998 | Walker et al. | 705/1 |
| 6,067,621 A | * | 5/2000 | Yu et al. | 713/172 |
| 6,163,771 A | * | 12/2000 | Walker et al. | 705/18 |
| 6,189,787 B1 | * | 2/2001 | Dorf | 235/380 |
| 6,266,413 B1 | * | 7/2001 | Shefi | 380/46 |

FOREIGN PATENT DOCUMENTS

EP             851335 A2  *  7/1998  ............. G06F/1/00

OTHER PUBLICATIONS

Rowland, Elaine Teleconnect, v15, n1, p80(12), Jan. 1997, En garde, phreakers!(toll fraud and scurity gear and services).*

* cited by examiner

Primary Examiner—James P. Trammell
Assistant Examiner—Calvin L Hewitt, II
(74) Attorney, Agent, or Firm—Dilworth & Barrese, LLP (57) ABSTRACT

A telecommunication total security system of financial transaction substantially diminishes any risk of continued illicit use of payment means. The system comprises one or more user identification codes to be coupled with transaction codes when carrying out a financial transaction. Each transaction code is unique and unrepeatable for each transaction and is generated by an administrator of the system. Each transaction code is cancelled when the transaction is terminated.

22 Claims, 7 Drawing Sheets

SECURED FINANCIAL TRANSACTION SYSTEM USING SINGLE USE CODES

FIELD OF THE INVENTION

The present invention relates to a financial transaction system having high security because it uses single use codes thus eliminating totally the risk of a continued illicit use of a payment means misappropriated in any way and any means to the legitimate user.

BACKGROUND OF THE INVENTION

All the payment systems where the financial transaction is effected without actual movement of cash money or any material payment means have a more or less high risk that the mechanisms and/or the results of the transaction are intercepted and/or misappropriated.

The security problem up to now was approached by adopting more and more sophisticated and complicated measures of protection but all these solutions have the drawback that the illicit use when started may continue undisturbed up to the moment in which it is discovered.

The system presently adopted regulating the use of credit cards provides that they use codes (numerical, alphanumerical, holographic codes and so on) identifying the owner (card holder) and his financial power warranting the credit for the financial transaction through the credit card.

In case of remoter payments through credit cards, it happens that the card holder must transmit to the transaction recipient all the card data authorizing the user for the agreed amount. In addition to the risk that the data can be illicitly used by the recipient, there is the much more frequent and actual risk of data interception by third parties illegally tapping into the communication between the two transaction parties or the data are subsequently misappropriated by ill-intentioned persons. The damage and inconvenience caused in these cases are well known.

The credit cards presently used have a poor degree of security and are subject to various kinds of problems and risks. The most important ones are the interception of the fixed codes of the credit card by ill-intentioned persons; in this case the misappropriator may carry out several transactions of various, and perhaps high, monetary value before the card holder realizes and does anything about it; and theft or loss of the credit card and also in this case the misappropriator once holding the credit card may carry out several transactions of various, and perhaps high, monetary value before the card holder realizes and does anything about it.

These problems of the credit cards have caused and are still causing huge damages both to the entities issuing the credit cards and to the card holders when they undergo these crimes. In view of these problems use of the credit cards as a payment system especially in some countries has difficulty gaining ground and sometimes is even opposed by the mass media especially for some special uses as the payments through internet where on the contrary the payment system by credit card is the most suitable for E-Commerce. It is clear that this situation creates serious damage and bias against the rapid development of E-Commerce on a worldwide scale.

SUMMARY OF THE INVENTION

The system according to the present invention consists of the basic principle that each financial transaction is provided with unique and unrepeatable identification means that are cancelled as soon as the transaction is terminated so that nobody including the legitimate holder may use again the same means to carry out new transactions and in the most advanced embodiments nobody including the legitimate holder knows in advance the new identification means that will be generated by the system to allow access to the subsequent transaction. In this way the risk of misappropriation is always limited to the only current transaction even in the most adverse and unfortunate circumstances. But even in case of theft, when using a secret transcodification code, the burglar cannot make any practical use of the card because the transaction code has not been transcodified as yet and therefore is not accepted by the system.

Therefore the system of the present invention really allows to carry out the so called monetics, that is a universal system of virtual money that is moved through an identifying single use code while under the term card any kind of support (paper, magnetic, electronic or else) is to be understood for the single use code allowing the movement of virtual money.

Therefore even if the term credit card or simply card will be used hereinafter, it is to be pointed out that the system is not at all limited to the use of cards as a support for the single use code.

DESCRIPTION OF THE INVENTION

The system according to the present invention will be now disclosed in detail with reference to some preferred embodiments, but it has to be understood that it is not limited in any way by the specific material means required for carrying out the system, as such material means may be all the means presently existing or that may be adopted in future for carrying out commercial, banking, computing transactions, and for transmitting, storing and/or processing data as well as the programs for implementing and managing such functions.

It is also clear that the system according to the present invention is perfectly adapted to be used on a worldwide scale as it is already now fully compatible and usable on a world telecommunication network of telephone, television, radio, satellite, internet nature or any other exchange medium that could be introduced in the future by the technological progress.

Description of TSS operating system (Total Security System) using credit cards of the TASC and POUC type. Terms and abbreviations used:

| | |
|---|---|
| TSS = | Total Security System |
| CC = | Credit Card |
| TASC = | Throw Away Security Code |
| POUC = | Prepaid One Use Code |
| TCC = | Trans-Codification Code |
| PIC = | Payer's Identification Code |
| RIC = | Recipient's Identification Code |
| RIAC = | Recipient's Identification Access Code |
| T-PIC = | Telephone PIC |
| T-RIC = | Telephone RIC |
| TERM = | TASC Electronic Reader Machine |

The TSS System uses new security techniques and specific procedures to carry out fully its total security power. The TSS System in its more sophisticated embodiment has the following essential features.

1. Use of a secret numerical or alphanumerical code TASC of any length but preferably sixteen or more digit long; it is a throw away code to be used for only one financial transaction. The TASC code is stored inside the memory of the TASC card on a magnetic band or microchip together with a predetermined set of other progressive TASC numbers with a secret sequence criterium known only by the administrator by which the TASC codes are generated.

2. Use of a numerical or alphanumerical fixed code PIC of any length but preferably sixteen or more digit long printed in a visible way on the TASC card. This is the identification code of the client holding the TASC card. The PIC code is not secret, on the contrary must be well known by banks because is the identification code of the client holder of the TASC card. Coupling the TASC code with the PIC code gives an almost infinite series of unique combinations hard to be repeated. Consider for instance the following casual coupling obtained with two codes of sixteen digits randomly chosen: 978A U753 2N8K RN7×7Y41 O3T2 HJ8Y Z2 KD.

3. Use of an electronic device TERM to read the TASC credit cards and more particularly the TASC codes stored in the memory of the TASC card. The TERM device has not only the reading function, but has also an alphanumerical keyboard to communicated data to the TASC card. The TERM device will be available either in a medium size format (for instance 12×20 cm) to be connected to a power supply, or in a smaller pocket format which is battery operated. Both devices can be interfaced with personal computers and other computers. In its most sophisticated phase the TERM device could even by provided with a little printer also in the pocket format, with the possibility of printing for instance the effected transactions.

4. Use of a numerical or alphanumerical transcodification code TCC preferably of three of four digits fully secret and known only by the TASC card holder and the administrator. The relative shortness fo the TCC code of only three or four digits is suggested by the fact that this code must be absolutely memorized by the client holding the TASC card. It could be also possible that the administrator for particular purposes of high protection and security, may provide also longer TCC codes for special TASC cards or special transactions of high monetary value; it is also possible to provide different codes for transactions with different maximum values. The TCC code has the purpose to encode the TASC numbers on the card so that they cannot be read by ill-intentioned third parties in the event that a TASC card is provisionally or finally in their hands as in case of theft. Indeed a possible theft of a TASC card would not lead to any loss of money because the burglar could not use any of the TASC codes written in its memory even if he would force a TERM device to read them; indeed the TASC codes to be valid and recognized as such by the administrator, must be firstly transcodified by inputting the TCC code in the TERM device, but the TCC code cannot be known by the burglar and therefore he cannot carry out even one transaction with the stolen TASC card. Moreover a burglar, even if he would try to decipher the TCC code, could not succeed because the TASC codes of the preceding transactions remain on the TASC card stored only in transcodified form without the matching untranscodified TASC code just to avoid even this hypothetical risk. The untranscodified TASC codes may be referred to as "incipient" codes because they do not become actual useful codes until they are transcodified with the TCC code.

5. Use of a fixed RIC code by the user recipient of the payments made by TASC card. The RIC code is allotted by the administrator to the recipient upon his own request. The RIC code is numerical or alphanumerical of any length but preferably sixteen digits or more long; this code is not secret and is the identification code of the recipient user. The RIC code is written also on a proper card called RIC card that can be used by the recipient for quick transactions on a computer because it is provided with a memory on magnetic band or microchip with all the significant data of the recipient including his RIC code and a RIC code that is the recipient's identification for access code: such a code is secret and identifies the recipient user allowing him, once he has obtained the online access to the administrator, to know the details fo his financial situation: receipts, credits, validity of the TASC codes of the customers, corresponding amounts and so forth.

Description of the Operating System Using the TSS (Total Security System)

Description of the Operating System Using the TASC Card

1. The administrator implements two different systems of transferring payments effected with TASC card to the recipients. The first system is a privileged system and is reserved only to suppliers or beneficiaries holders of RIC card and warrants a confirmation of payment by the administrator in real time for the payments with TASC card while the actual transfer of the money will take place according to deadlines fixed by administrator for instance once a month. The suppliers beneficiaries holding an RIC card may use several types of privileged services by the administrator such as the possibility to obtain an advance corresponding to a percentage to be determined on their monthly receipts through the TASC card. The second system is a system of a standardized payments with procedures having a greater caution and security and is reserved to suppliers of goods or services that do not hold an RIC card. More particularly the administrator before confirming the payment to the recipient, will await the written confirmation of the transaction both from the recipient and the payer according to rules fixed by the administrator itself. The transfer of money will always take place in a deferred way according to deadlines fixed by the administrator.

2. The administrator prepares the TASC card on which in addition to the security systems already available as holograms and so on the following codes are inputted: A) the fixed PIC code which is an identification code of the payer user, printed on clearly legible numbers as it is a code that does not need secrecy. B) A set of invisible TASC codes because they are stored in the memory of the TASC cord on a magnetic band or microchip. The TASC codes may be conceived and generated according to different security logics that the administrator will deem advisable. These logics may use blocks of TASC numbers corresponding to different values (for 1000 and so forth) or logics based on time, for instance connected to due dates with maximum amount of daily use and so forth. According to the logics used there will be available TASC cards of different types which will then be offered to the user that will make a choice according to his own specific needs. As to the generation of the series of TASC numbers, said generation will be carried out by a computer that will generate them according to different criteria known only by the administrator. The administrator will in turn keep stored the series of TASC numbers coupled to the fixed PIC code printed on the TASC card.

Figures 5A, 5B:
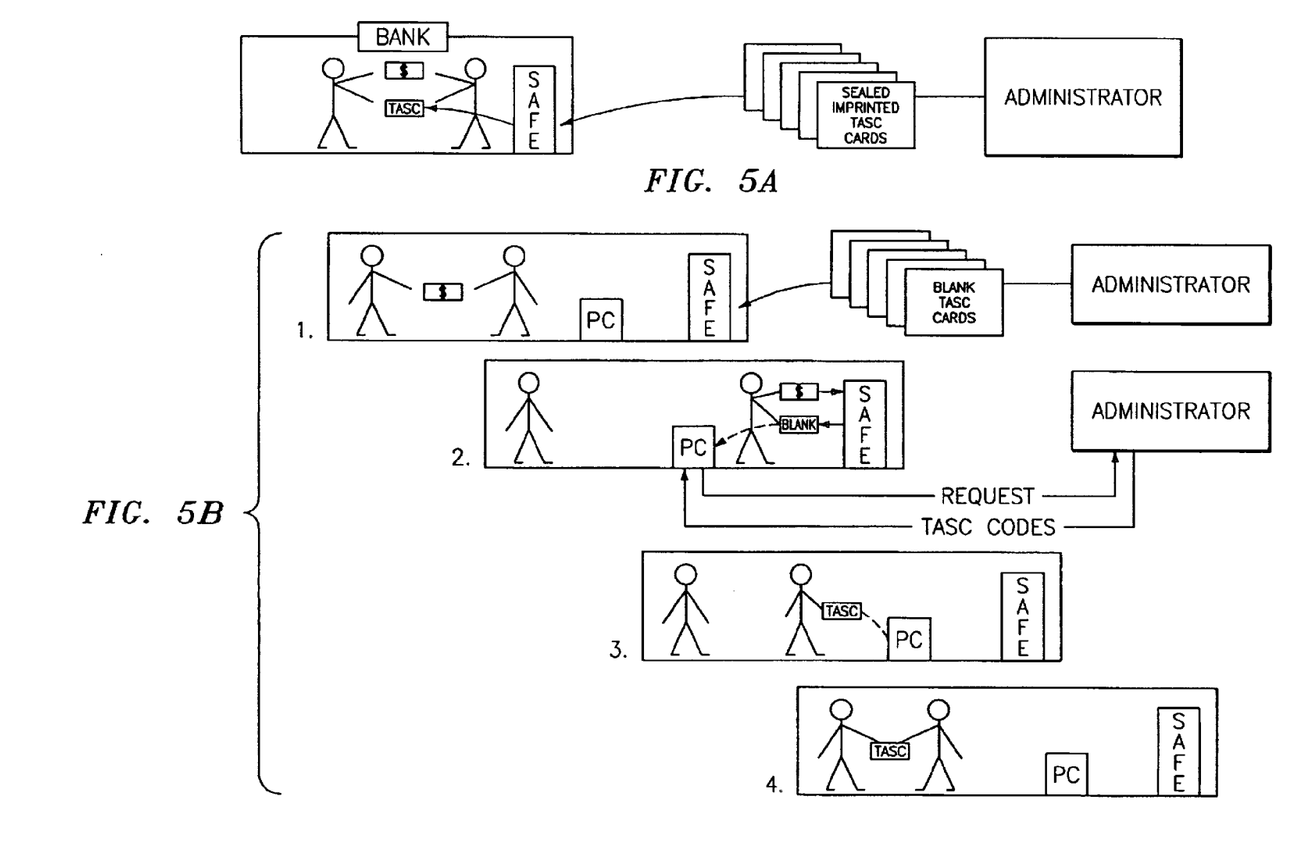
FIGS. 5A and 5B are block diagrams of TASC card delivery systems according to embodiments of the present invention.

In order to avoid the series of TASC numbers progressive read by ill-intentioned persons before the TASC cards are delivered to the user there are two systems as shown in FIGS. 5A and 5B, namely:

First system: each TASC card will be forwarded to the banks enclosed in a single sealed protection envelope as shown in FIG. 5A. Such an envelope can be opened only before the user client. A TASC card with open envelope cannot be accepted by the client and therefore has to be annulled.

Second system: the as shown in FIG. 5B, the series of TASC codes will be stored in the memory of the TASC card only at the activation of the card upon request of the user at a bank connected through computer network with the administrator that will transmit the series of TASC codes as well as other possible data using an encrypted transmission system. This second system could be preferred by TASC cards of types other than the standardized ones.

3. The bank will keep in its offices a number of TASC cards ready to be used or to be activated. The TASC cards ready to be used will be of the standardized type and delivered to the user in an sealed envelope. Special TASC cards of different types could also be envisaged. These cards could have the TASC codes stored in the memory of the TASC card only at the time of its activation through the computer of the bank connected to the administrator just when delivering the TASC card to the user.

4. The user client goes to the bank and chooses the preferred type of TASC card and the bank if the client has the predetermined requirements may deliver the TASC card immediately either of a standardized type or special type.

5. The user client before being allowed to use the TASC card must choose his own TCC code consisting of three or four alphanumerical digits. He must choose it in such a way that the code is known only by himself and is easy to be remembered because he should preferably keep it only in his mind. If he has memory problems he could write his TCC code in a secure place or with a particular coding system. In any case once the user client has chosen his own TCC code, he will communicate it to the administrator through the computer of the bank from a secluded place so that nobody can read it, or through a personal computer from his home provided that he must contact the administrator and communicate the TCC code with a secured and encrypted system.

6. The user client once holding his own TASC card, may carry out any kind of payments because he can operate with the maximum security and safety. The different kinds of payment may be divided into four big categories representing the entirety of cases.

Figure 6A:
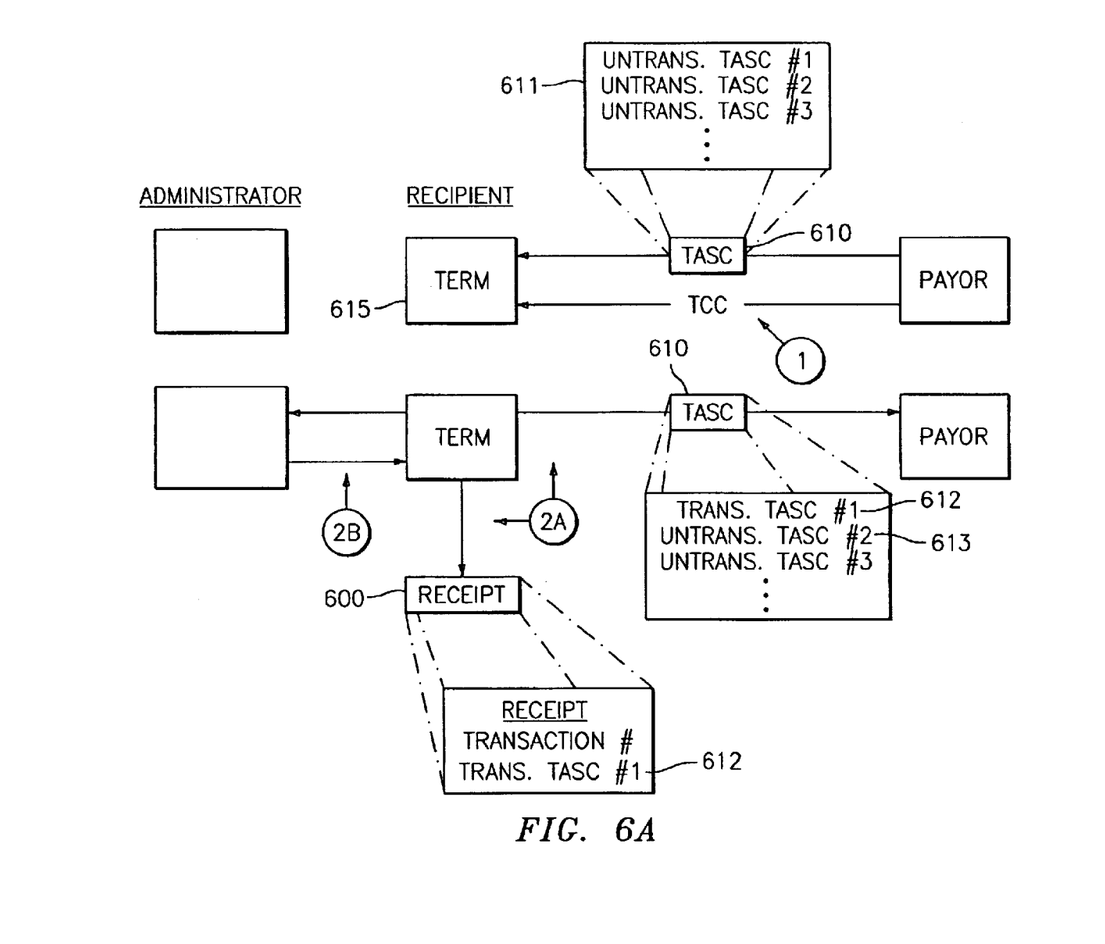
FIGS. 6A and 6B are block diagrams of embodiments of TASC card usage systems according to the present invention.

A) First case: the recipient is a shop, a restaurant and so forth, that is an operator having card readers with magnetic band or microchip and holder of a RIC card. In this case, which is illustrated in FIG. 6A, his hardware will be provided with a special program supplied by the administrator, adapted to read on the TASC card 619 of the payer user untranscodified TASC No. 1, indicated by Ref. No. 611, allotted to the present payment operation. Before effecting the transaction the payer user must dial his TCC code on the card reader TERM 615 avoiding that third parties can read it (step 1 in FIG. 6A). The untranscodified TASC No. 1 (511), thus transcodified becoming transcodified TASC No. 1 (612), will be written and coupled to this transaction on the recipient receipt 620 as well as in the memory of the TASC card (step 2A in FIG. 6A). The transcodified TASC No. 1 (612) is stored in TASC card 610 alone, without keeping untranscodified TASC No. 1 (611); this is done to avoid that expert misappropriators having illegally held the card or known a card transaction, may decipher the secret, by reading together the TASC code both before and after the transcodification. At the same time, a new TASC code, untranscodified TASC No. 2 (613), will be made available for a subsequent transaction and this new number to be valid must in turn be transcodified before use. In view of the privileged treatment of the holders of the RIC code, the recipient will receive the confirmation of the validity of the transaction from the administrator in real time (step 2B n FIG. 6A. It is of course preferable that the payer user signs the receipt shown to him by the recipient operator. In this case the user client if desired could transfer for further security reasons, all the data relating to said transaction through internet or phone to the administrator to confirm his transaction.

Figure 6B:
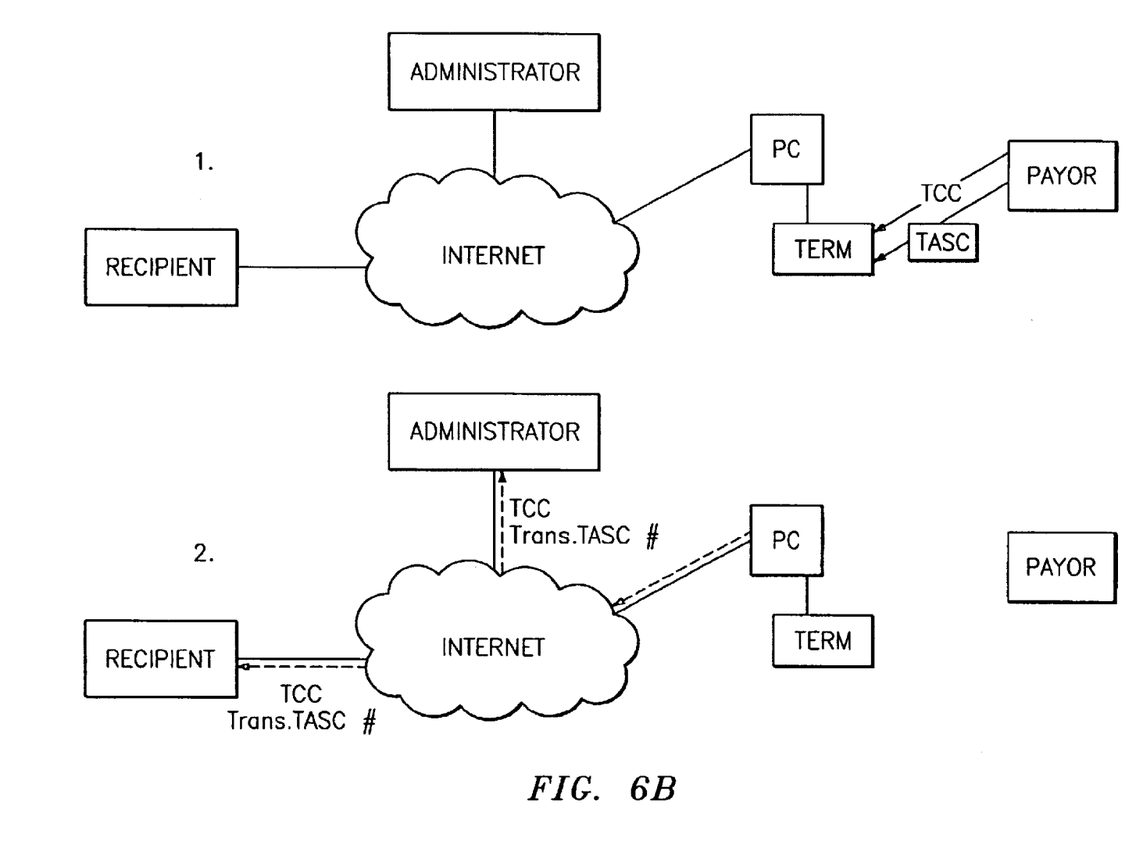

B) Second case: the recipient, as shown in FIG. 6B, is a company supplier of goods or services holding an RIC card and operating via internet and the payer user buys goods or services through internet. In this case reading of data of the TASC card may take place automatically with the payer's own TERM device connected to the computer. The payer user will dial directly on the TERM device or on the payer's computer the data relating to such a transaction and his own TCC code, while he will read on the TERM device the data of the TASC card including the already transcodified number of TASC code allotted to such a transaction and will transfer them on the monitor (step 1 in FIG. 6B); these data will be transmitted by him to the recipient company and in case also to the administrator for a confirmation always though internet (step 2 in FIG. 6B). In its turn the recipient will arrange for receiving a confirmation of the payment from the administrator in real time as provided by the special procedure devised for the holders of the RIC card.

C) Third case: the recipient although he holds a RIC card, is an entity not provided or provisionally unprovided with computerized systems. In this case the payer user should be in a position to communicate to the recipient the transcodified TASC number. This number can be found by the payer user through his pocket TERM device or a TERM device connected to a computer. For the rest the transaction will be carried out with the rules indicated in the preceding cases.

D) Fourth case: case in which the recipient is not a holder of RIC card. In this case the procedure is similar to the preceding three cases with the difference that procedure of standardized payment instead of the privileged one is activated. More particularly the payer user must communicated to the administrator all the data relating to the payment with any proof predetermined by the administrator including in case also the signature of the payer client. Only after receipt fo said data the administrator will arrange for the confirmation of payment to the recipient and subsequently make said payment according to the dead lines fixed by the administrator for this procedure.

The foregoing description is a complete description of the TASC system with all its methods to obtain the total security. This system will be used when the maximum security is desired also for the credit cards and the corresponding payments. However the administrator may decide to use only some of these systems and procedures or parts of them for types of credit cards of less importance such as the POUC cards that will be described hereinafter or for less important payments that do not require such a sophisticated protection system so as to make easier use of these minor cards.

DETAILED DESCRIPTION OF THE PREFERRED EMBODIMENTS

Description of the Operating System for the POUC Card

The principle on which the POUC system is based is the use of throw away single use codes for credit cards for remote financial transactions such as for E-commerce, telemarketing, telecom sales and so on. The main novel features of the POUC card systems are mainly the following: 1. The POUC code identifies the transaction indicating the monetary amount predetermined by the administrator or user is possibly prepaid. 2. The POUC code is used only for one single transaction at the end of which the administrator will cancel the code preventing any other transaction with it. 3. The POUC code is the title to have access to the credit which is defined and limited to one single transaction. Because a card may have multiple POUC codes for multiple possible transactions, the POUC codes may be said to correspond to "incipient" financial transactions until they are actually used.

The POUC system may be implemented at several different degrees of security, including the use of encrypted codes and card readers. However, the cost of implementing the system on a wide scale increases considerably with every degree of complexity. The degree of security must be balanced by the system cost and complexity. The following diagram of financial flow is the simplest application of the system. This diagram relates to a card for single transfer of money: it allows to transfer an amount of money determined by the user and exactly corresponding to the amount to be transferred to only one recipient.

Figure 1:
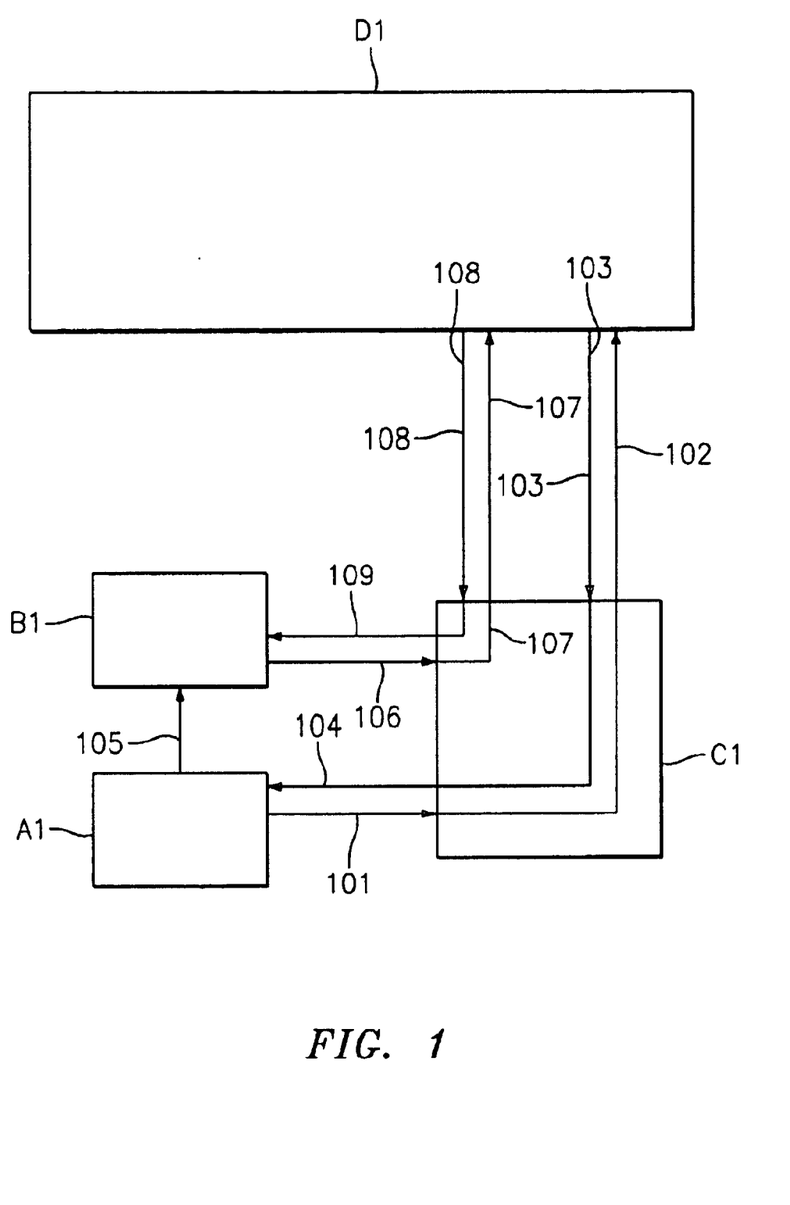
FIG. 1 is a flow chart showing use of a POUC card suitable for single use payment.

Description of the Flow Chart FIG. 1

A1—User that has to effect a payment (payer)

B1—User that must receive the payment (recipient)

C1—Bank member or the system=bank

D1—Administrator of the system

101—The payer user goes to a bank member of the system and requests a POUC card indicating the desired nominal value.

102—The bank sends the request to the administrator through the terminals of the system.

103—The administrator generates a POUC card allotting to it the requested value, stores on its computers said data assigning them to the applicant user and sends them to the bank through the network.

104—The bank receives the code and the corresponding value, transfers the data on paper, electronic or other substrate by means of a printer connected to the terminal so as to produce a card protected in a sealed envelope where the data relating to the POUC code are concealed and available only to the payer user when opening the sealed envelope.

105—The payer user who must transfer the amount to a recipient, communicates to him the amount and POUC code by phone, computer, or else.

106—The recipient goes to a bank member of the system and presents the POUC code in the way established by the administrator and the bank.

107—The bank verifies through connection with the administrator, the validity and the nominal value of the POUC code.

108—The administrator confirms validity and amount and gives to the bank the approval for paying the amount.

109—The bank pays to the recipient the agreed amount where possible transaction costs will be debited him.

In this way any intrusion of unauthorized persons that could discover the POUC code would at most use the same code only once and for the fixed amount with limitation of the damage and no possibility to repeat it.

POUC Card for Multiple Payments

This is a card with a nominal value determined by the administrator by which it possible to carry out several transactions of amounts of money determined by the user up to the full use of the value of the card. The following system provides for the use of other codes and procedures coupled to the POUC codes.

The coupled use of other codes and protocols for specific use may render safer a transaction and almost impossible the illicit use of the codes by possible that could discover them during the transmission of data or by a fraudulent access to the data banks.

Some of the condition hereinafter described allow more complex and complete operating patterns:

1. Two different types of users have access to the system: payer users that must effect payments with the POUC system and recipient or beneficiary users that intend to receive payments with the POUC system.

B) The payer users receive from the administrator through a bank two kinds of codes in a sealed substrate (paper or else); the codes are the following:

PIC (Payer's Identification Code) a preferably secret code identifying user and nominal value of the card; this code allows the payer once entering the online service of the administrator, to carry out payment orders and is used for a plurality of transactions up to the full consumption of the credit corresponding to the card value.

POUC (Prepaid One Use Code). This code identifies each single transaction operation, its amount and is indicated on the transaction operation and communicated to the recipient; the POUC code is used only once and thereafter is cancelled by the central system.

3. The recipient or beneficiary users receive from the administrator through a bank two types of codes: RIC (Recipient Identification-Code) identifying the recipient or beneficiary user constituting the payment parameters for his debtors who must use such a code as credit destination data when effecting the payment operation.

RIAC (Recipient's Identification For Access Code): this code is secret and identifies the recipient user allowing to know the data relating to his financial situation after having obtained access online: receipts, credits, validity of the POUC codes of the customers, corresponding amounts and so forth.

4. Administrator—users on line system with access from authorized telephone numbers: the system allows access from previously indicated telephone numbers to carry out orders of payment, checking and updating of the data.

These conditions and types of codes should not be considered the only binding ones for autonomy and identity of the POUC card system, one of the possible embodiments of this throw away code system with the above described codes and conditions are described hereinafter with the details illustrated in the flow chart FIG. 2.

Figure 2:
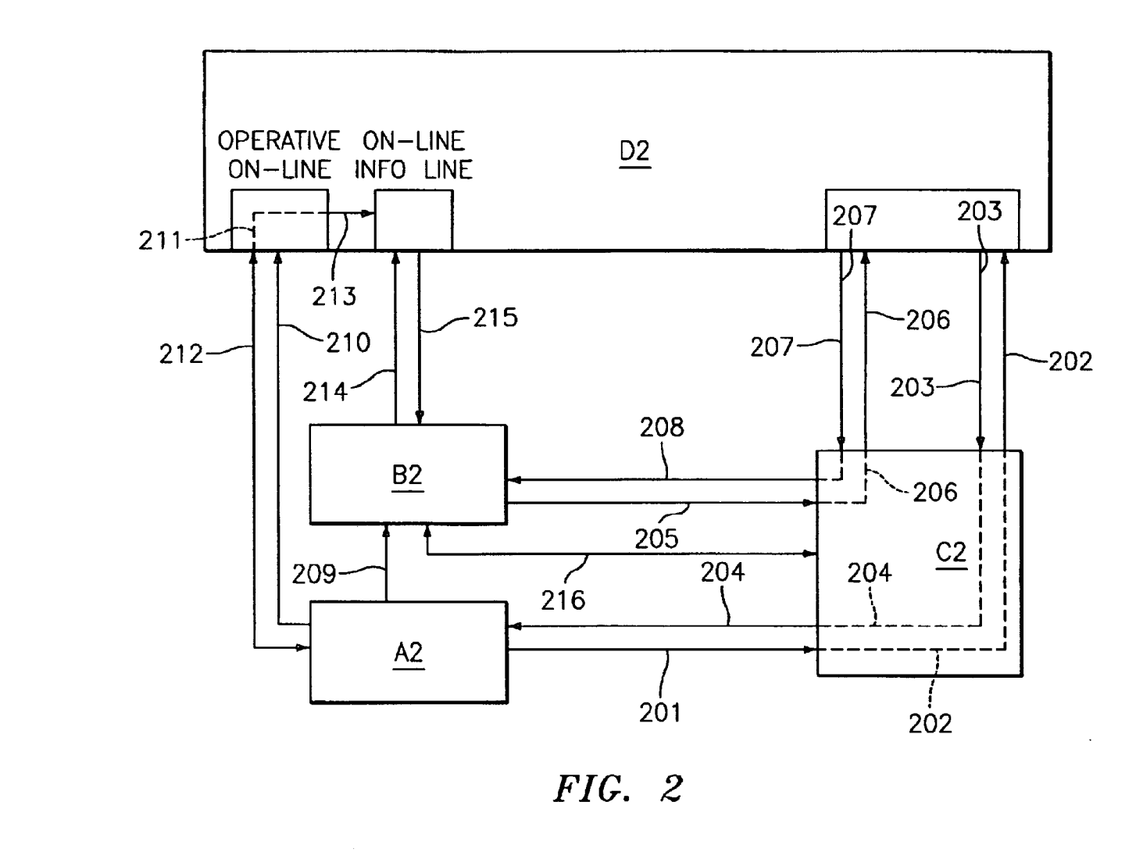
FIG. 2 is a flow chart showing use of a POUC card adapted to effect a plurality of payments.

Description of the Flow Chart FIG. 2.

A2=Payer
B2=Recipient
C2=Bank
D2=Administrator.

201—A payer user requests to his bank a POUC card indicating the amount of requested credit, his personal details, the telephone number from which he will have access to the online service.

202—The bank sends through terminal the request of the payer to the administrator.

203—The administrator generates the PIC and POUC codes, coupling them to the details of the client and to the telephone number from which the payer user will have access to the service, then coupling to the requested value and having stored the whole, transmits the data to the bank.

204—The bank received in real time the data, transfers them on to a substrate and after having sealed the card delivers it to the payer user.

205—A recipient user requests to his bank to become a member of the POUC system to receive payments by POUC card and gives his own details including the telephone number from which he will have access to the online service.

206—The bank sends the data of the recipient to the central system of the administrator.

207—The administrator generates the RIC and RIAC codes and transfers them to the bank after having stored and coupled to the telephone number from which the online access will be allowed.

208—The bank through terminal and printer transfers the data on to a substrate (paper or else) that will be sealed and delivered to the beneficiary or recipient user.

At this point the payer user may have access to the online service through his own telephone number authorized and confirmed and when he will enter the online service through a no charge 800 number, he will be able to effect payment orders using the card codes: one PIC code that will allow him to carry out several transactions up to the full consumption of the card value and several POUC codes, each POUC code to be used only once for transactions of an amount equal to a fraction of the total value, and the RIC code given him by the beneficiary or recipient of the payment, that will be the destination identification of the payment.

209—A payer user agrees with a recipient a transaction and obtains the RIC on which the payment must be effected, communicates to the recipient the POUC code and the corresponding amount.

210—The payer user calls the no charge 800 number from his own authorized telephone number, enters the online service of the administrator and following a voice message dials the access code to the operations (PIC) then the POUC code, the amount to be transferred and the RIC code of the recipient.

211—The administrator system stores the data and updates the residual balance available for a new transaction of the payer user.

212—When the payer user will enter again the online system, he will receive the details of the balance and if there is a residual credit he will be able to carry out a new payment transaction with a new POUC code.

213—The administrator system makes the data partially available on the online system of the recipient so as to allow the recipient beneficiary users to verify the credit operations on their own codes from the payer users.

214—The recipient user enters the online service of the administrator system form the authorized telephone number and dials his own RIAC code to have access to the data and then RIC+the POUC code of the customer to verify that the payment was credited;

215—The system will confirm him the validity or invalidity of the POUC code and in the positive case the amount credited.

216—Within the terms indicated by the bank the recipient will be materially credited with the amounts of the transactions.

Other operative conditions and/or types of codes to be coupled to the POUC code will allow several and diversified application patterns that anyway are based on the principle of inviolability and unusability of the codes because the POUC system in addition to the throw away code provides for the use of codes constituting identification of the destination of the transaction and therefore of the recipient.

Another operative pattern of the POUC system provides that the subjects of the operative network (administrator-distributor-clients) are also of a juridical nature her then the nature of the subjects traditionally administering the financial credit and banking networks such as banks, merchant banks, finance companies, trust corporations and so forth). The following example provides for the administration of the POUC system by telephone companies.

The phone POUC system provides for use of the access telephone number as identification code of the subjects (administrator, reseller, users) coupled with the POUC codes identifying each single transaction (transacted amount).

The telephone company or administrator is provided with systems adapted to recognize the telephone numbers from which calls are made and to allow the access only to the authorized numbers, namely the numbers stored in the memory. The computer of the administrator generates POUC codes and transfers them on card substrate (paper or else). The administrator assigns to the cards diversified nominal values. The card has a nominal value predetermined by the administrator, a series of POUC codes, a telephone number for the access to the administrator's system to carry out online transaction and to activate the cards. The card is packed in such a way to conceal said data while from outside it is only visible an activation code. The computerized system of the administration stores every data relating to the card and for each card waits for the activation by the reseller.

The reseller member of the system has communicated to the administrator the telephone number from which he will have access to the computerized system of the administrator to allow the recognition and consequent access authorization; at this point the reseller when selling a card to a user, will make it operative simply calling the administrator's telephone number, dialing the activation code of the card and the telephone number of the client. In this way only the telephone number of the client user will have operative access through the administrator to the POUC codes of the card because this telephone number will be the only one authorized and confirmed to have access to the service and to use the code or codes contained in the card. The client holding the card may carry out transaction operations in the following way: having opened the sealed card, he will call with his own telephone authorized by the administrator the no charge 800 number printed on the card so as to have access to the central system of the administrator; a voice message will request him to dial the code or one of the codes contained in the card, the amount to be transferred and the telephone number of the recipient of the transaction. The system will store every transaction debiting the transacted amount on the card and crediting the amoun6t on the telephone number of the recipient. If the amount of the transaction is equal to card value, the client cannot make any other transaction; if on the contrary the amount of the transaction is lower than the card value, the client will have the opportunity of other accesses to the system by using other POUC codes contained in the card up to the complete consumption of the credit value.

The administrator will automatically call the recipient at the authorized telephone number and communicate the credited amount and its origin.

The recipient can go to any reseller of the system to cash the credit in the following schematically described way: before the reseller he will call the no charge 800 number of access to the administrator that will recognize the telephone number and will allow the access, then he will dial the POUC code communicated him both from the administrator and the payer client, the telephone number of the reseller and in case also the amount to be transacted. The administrator communicates in real time to the reseller the credit in his favor indicating the telephone number that effected the transaction. The reseller can now clear the credit to the user. The financial relationship between administrator and reseller will be finalized between the parties in the terms that they will mutually agree.

Figure 3:
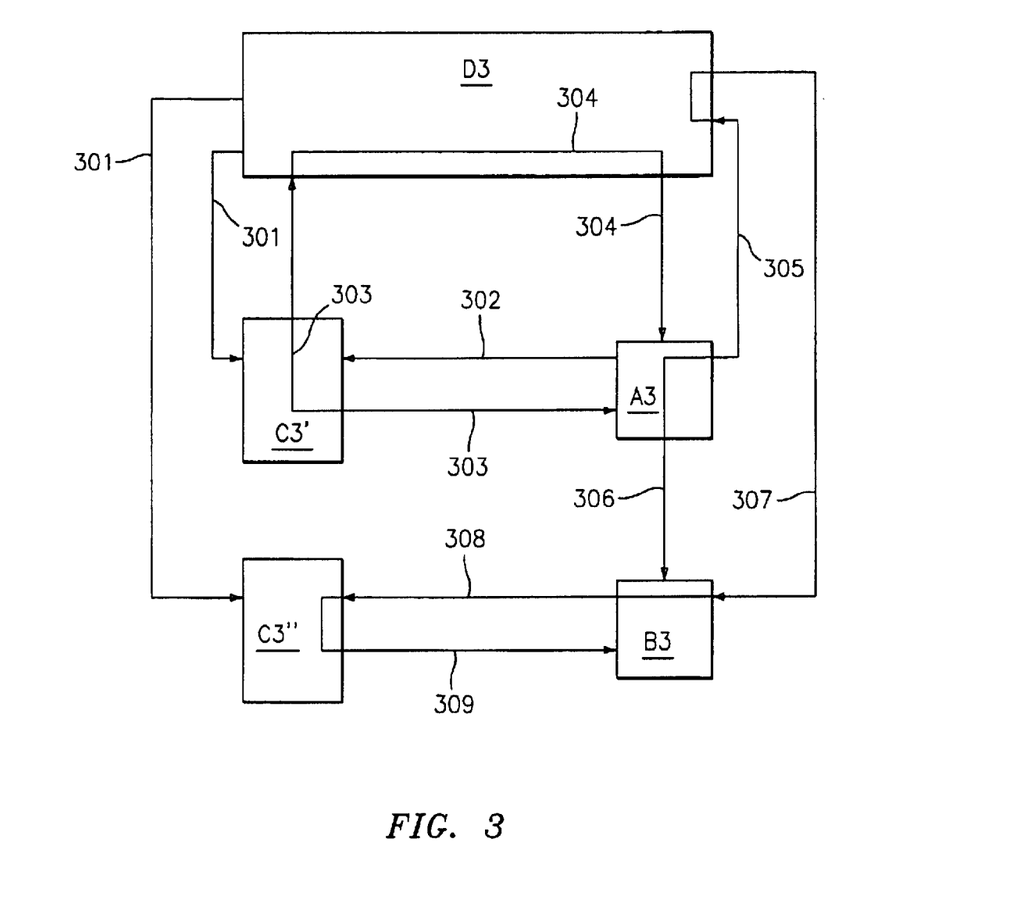
FIG. 3 is a flow chart of a POUC system to be used for transactions through telephone companies.

Description of the Flow Chart FIG. 3
A3=Payer/Client
B3=Recipient
C3'=Reseller selling the POUC card
C3"=Reseller where the transferred amount is cashed
D3=Administrator 301—The administrator provides the reseller with POUC cards and authorizes the telephone number of the reseller in its own computerized online system so as to allow the operative access.

302—A user goes to the reseller's to buy a POUC card.

303—In his shop the reseller through his authorized telephone number, connects to the administrator giving the activation code of the card that is about to be sold and the telephone number of the client. Having confirmed the effective credit, the POUC reseller gives the client the POUC card.

304—The administrator stores the transaction by crediting the amount of the card to the telephone number of the client and calls him by phone automatically to confirm that the credit has been effected.

305—The client holder of the card opens the sealed card and carries out a transaction: he connects to the administrator through the number printed on the card, he is recognized because he is authorized and has access to the operations: then he dials one of the POUC codes indicated on the card, the amount to be transferred and the telephone number of the recipient.

306—The client informs the recipient of the arriving credit giving him the POUC code used.

307—The administrator system calls the telephone number of the recipient informing him of the credit in his favor indicating the origin.

308—The beneficiary user or recipient goes to the shop of one of the system resellers to cash the credit: when he is in the shop, he effects the transfer of the credit in favor of the reseller in the way known and described hereinbefore, the administrator confirms to the reseller by phone that the amount has been credited in his favor. For greater security, the Administrator can call back the card holder and/or the recipient to have the confirmation of the identity of the person requesting the transaction.

309—The reseller clears the amount to the beneficiary recipient.

Figure 4:
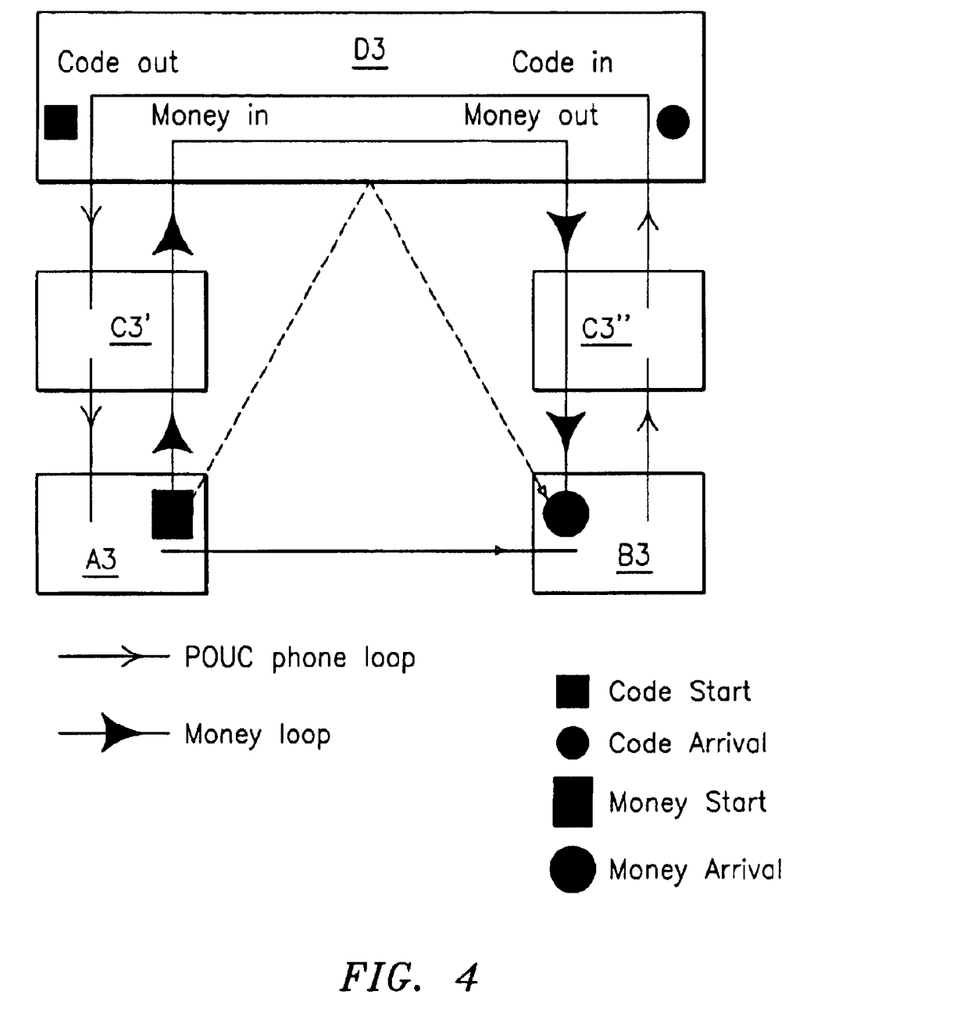
FIG. 4 is a simplified diagram of the phone POUC system of FIG. 3 showing the POUC and money loops.

FIG. 4 illustrates a simplified diagram of the loop followed by the code and that followed by the money, respectively, in the phone POUC system of FIG. 3 described hereinbefore.

Each transaction is registered by the administrator and upon request of the client is available on a document that will be valid as bookkeeping evidence of each transaction. In the case hereinbefore described the POUC code identifies the amount of the credit while the telephone number identifies the subjects of the transactions (reseller, payer client and beneficiary recipient), constituting automatic access to the operative and information online service in view of the suitability to recognition of such numbers and their authorization to carry out on line operation by the software of the administrator system.

While the present invention has been described in some detail by the best mode presently known and the presently preferred embodiments, it is to be understood that several modifications, additions, substitutions and variations of elements could be resorted to the system without the departing however from its spirit and scope as defined in the appended claims.

What is claimed is:

1. A telecommunications total system for conducting financial transactions between at least one payer and recipient users comprising:

a means for generating at least one payer identification code identifying at least one payer and associated with a card issued to the at least one payer for conducting a financial transaction with a recipient user, the at least one payer identification code including an authorized payer telephone number;

a means for generating a plurality of single use transaction codes stored in the card; and a means for generating a transcodification code and means for selectively coupling the transcodification code to the plurality of single use transaction codes to encode a respective single transaction code, the respective encoded single use transaction code being coupled with the at least one identification code to create a coupled code unique and unrepeatable for authorizing each transaction initiated from a telephone of the authorized payer telephone number and recognizable by an administrator of the system.

2. The system according to claim 1, wherein the at least one payer and recipient users are connected directly to the administrator.

3. System according to claim 2 wherein the at least one payer carries out the transactions with the administrator through the recipient users associated with the administrator.

4. The system according to claim 2, wherein communication between the at least one payer and recipient users and the administrator is used for information and confirmation exchange purposes.

5. The system according to claim 2, wherein communication between the at least one payer and recipient users is used for information and confirmation exchange purposes.

6. The system according to claim 1, wherein one of the single use transaction codes is a throwaway security code (TASC).

7. The system according to claim 6, wherein the at least one payer and the recipient users are provided with an electronic reader machine of throwaway security codes (TERM).

8. The system according to claim 1, wherein one of the single use transaction codes is a prepaid single use code (POUC).

9. The system according to claim 1, wherein the transcodification code (TCC) is secret and memorized by the at least one payer, the transcodification code (TCC) being inputted to obtain authorization of each financial transaction.

10. The system according to claim 1, wherein each of the recipient users has a respective recipient's identification code communicated by the recipient user to the and recognizable by the administrator for each financial transaction, the recipient's identification code including an authorized recipient telephone number associated with a telephone of the recipient user.

11. The system according to claim 10, wherein the respective recipient's identification code allows the recipient to gain access to the system.

12. The system according to claim 10, wherein the recipient identification code identifying the recipient user is coupled to the coupled code of the payer.

13. The system according to claim 12, wherein the identification code of the recipient user includes a recipient telephone number.

14. The system according to claim 1, wherein the single use transaction codes are stored in an encrypted form.

15. The system according to claim 1, wherein the single use transaction codes are stored in a random sequence.

16. The system according to claim 1, wherein the single use transaction codes are stored in predetermined sequences.

17. The system according to claim 1, wherein a nominal value of each financial transaction is uniform.

18. The system according to claim 1, wherein the plurality of single use transaction codes can be personalized according to the needs of the at least one payer.

19. The system according to claim 1, wherein the plurality of single use transaction codes are stored in a microchip included in the card that generates automatically a subsequent coupled code upon introducing the transcodification code after termination of each financial transaction.

20. The system according to claim 1, wherein the plurality of of single use transaction codes are stored on a magnetic band.

21. The system according to claim 1, wherein each the plurality of of single use transaction codes comprises at least sixteen digits.

22. The system according to claim 1, wherein a nominal value of each financial transaction varies.

* * * * *

UNITED STATES PATENT AND TRADEMARK OFFICE
CERTIFICATE OF CORRECTION

PATENT NO. : 6,834,270 B1 Page 1 of 1
DATED : December 21, 2004
INVENTOR(S) : Pagani et al.

It is certified that error appears in the above-identified patent and that said Letters Patent is hereby corrected as shown below:

Column 12,
Line 48, insert -- security -- between "total" and "system".

Signed and Sealed this

Fifteenth Day of February, 2005

JON W. DUDAS
*Director of the United States Patent and Trademark Office*